(12) United States Patent
Petherick

(10) Patent No.: US 10,768,330 B2
(45) Date of Patent: Sep. 8, 2020

(54) SYSTEM AND METHOD FOR LOCATING A MARKER USING A LOCATOR WITH MULTIPLE TRANSMITTERS

(71) Applicant: Metrotech Corporation, Santa Clara, CA (US)

(72) Inventor: Stephen John Petherick, Exeter (GB)

(73) Assignee: Metrotech Corporation, Santa Clara, CA (US)

( * ) Notice: Subject to any disclaimer, the term of this patent is extended or adjusted under 35 U.S.C. 154(b) by 582 days.

(21) Appl. No.: 15/216,503

(22) Filed: Jul. 21, 2016

(65) Prior Publication Data

US 2017/0023692 A1    Jan. 26, 2017

Related U.S. Application Data

(60) Provisional application No. 62/195,736, filed on Jul. 22, 2015.

(51) Int. Cl.

| G01V 3/10 | (2006.01) |
| G01V 15/00 | (2006.01) |
| G01V 3/08 | (2006.01) |
| G01V 3/12 | (2006.01) |
| G01B 7/26 | (2006.01) |

(52) U.S. Cl.
CPC ............... *G01V 3/104* (2013.01); *G01B 7/26* (2013.01); *G01V 3/08* (2013.01); *G01V 3/12* (2013.01); *G01V 15/00* (2013.01)

(58) Field of Classification Search
CPC ............. G01V 3/104; G01V 3/08; G01B 7/26
USPC ................................................. 324/329, 326
See application file for complete search history.

(56) References Cited

U.S. PATENT DOCUMENTS

| 4,672,562 | A | 6/1987 | Egli |
| 6,954,072 | B1 | 10/2005 | Schlapp et al. |
| 7,356,421 | B2 * | 4/2008 | Gudmundsson ....... G01V 3/081 |
| | | | 324/207.11 |

(Continued)

FOREIGN PATENT DOCUMENTS

DE          19518973 A1    11/1996

OTHER PUBLICATIONS

International Search Report for PCT Application No. PCT/US2016/043720 issued by the US Searching Authority dated Oct. 18, 2016; pp. 1-2.

(Continued)

*Primary Examiner* — Reena Aurora
(74) *Attorney, Agent, or Firm* — Haynes and Boone, LLP

(57) ABSTRACT

A system and method of for estimating the depth of a marker may include a marker locator. The marker locator may include a first transmitter that generates a first activation signal, second transmitter that generates a second activation signal, a receiver that detects first and second response signals, and a processor that determines a depth of a marker based on the first and second response signals. The first transmitter is located at a first position, and the second transmitter is located at a second position apart from the first position. The first and second response signals respectively correspond to the first and second activation signals. The processor is coupled to the receiver. According to some embodiments, the first and second activation signals and the first and second response signals may be separated by time division multiplexing.

13 Claims, 6 Drawing Sheets

(56) References Cited

U.S. PATENT DOCUMENTS

| | | | |
|---|---|---|---|
| 2002/0030492 A1 | 3/2002 | Guo | |
| 2002/0130664 A1* | 9/2002 | Birken | G01V 3/15 324/329 |
| 2005/0156600 A1 | 7/2005 | Olsson et al. | |
| 2005/0159929 A1 | 7/2005 | Overby et al. | |
| 2013/0099790 A1 | 4/2013 | Doany et al. | |
| 2014/0333309 A1 | 11/2014 | Pearson et al. | |
| 2016/0109608 A1* | 4/2016 | Branson | G01V 3/10 324/329 |

OTHER PUBLICATIONS

Written Opinion for PCT Application No. PCT/US2016/043720 issued by the US Searching Authority dated Oct. 18, 2016; pp. 1-5.
European Search Report dated Apr. 26, 2019 issued in related European patent app. No. 16828660.7 (10 pages).

* cited by examiner

SYSTEM AND METHOD FOR LOCATING A MARKER USING A LOCATOR WITH MULTIPLE TRANSMITTERS

RELATED APPLICATION

The present application claims the benefit of U.S. Provisional Patent Application No. 62/195,736 filed Jul. 22, 2015, the entire contents of each being incorporated herein by reference.

TECHNICAL FIELD

The present disclosure relates generally to locating a marker and more particularly to locating a marker using a locator with multiple transmitters.

BACKGROUND

Markers are used to locate objects of interest that are buried underground (e.g., utility pipes and/or cables) or otherwise disposed in hard-to-reach locations. In general, markers are small, passive devices that are affixed in, on, and/or near the hard-to-reach objects during installation. After installation, markers allow the position of the object to be determined non-invasively (e.g., without digging into the ground). For instance, a resonant marker may be detectable by electromagnetic means at depths of up to 3 meters underground.

A locator is a portable, moveable instrument used to detect the location of the markers. A locator is equipped to transmit and receive signals (e.g., electromagnetic signals) to and from the markers. Based on these signals, the locator derives information about the position of the marker relative to the locator. The ability of a locator to accurately locate markers and/or the objects of interest that they are affixed to (e.g., utility lines) is highly desirable in many applications. For example, inadvertently digging into an electrical and/or gas line may result in injury, fires, toxic emissions, damage to the digging equipment, damage to the utility line, and/or the like. Furthermore, the ability to accurately locate markers provides greater knowledge about the layout of a site. For example, detailed knowledge about the location of underground lines at a given site may be helpful when planning construction and/or repair projects at the site.

Accordingly, it would be desirable to provide systems and methods for improved marker locators.

SUMMARY

A marker locator may include a first transmitter that generates a first activation signal, second transmitter that generates a second activation signal, a receiver that detects first and second response signals, and a processor that determines a depth of a marker based on the first and second response signals. The first transmitter is located at a first position, and the second transmitter is located at a second position apart from the first position. The first and second response signals respectively correspond to the first and second activation signals. the processor is coupled to the receiver.

A transceiver for locating a buried marker may include a plurality of transmitters that transmit a plurality of activation signals to the buried marker, and a receiver that detects a plurality of response signals corresponding to each of the activation signals from the buried marker. The plurality of transmitters are located in different positions.

A method for estimating a depth of a marker may include measuring an intensity of a first round-trip signal transmitted from a locator to the marker and retransmitted from the marker to the locator, measuring an intensity of a second round-trip signal transmitted from the locator to the marker and retransmitted from the marker to the locator, and estimating the depth of the marker by comparing the intensities of the first and second round-trip signals. The first round-trip is being transmitted by a first transmitter located at a first position, and the second round-trip signal being transmitted by a second transmitter located at a second position and having a different path length than the first round-trip signal.

In the figures, elements having the same designations have the same or similar functions.

DETAILED DESCRIPTION

In the following description, specific details are set forth describing some embodiments consistent with the present disclosure. It will be apparent to one skilled in the art, however, that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

Figure 1:
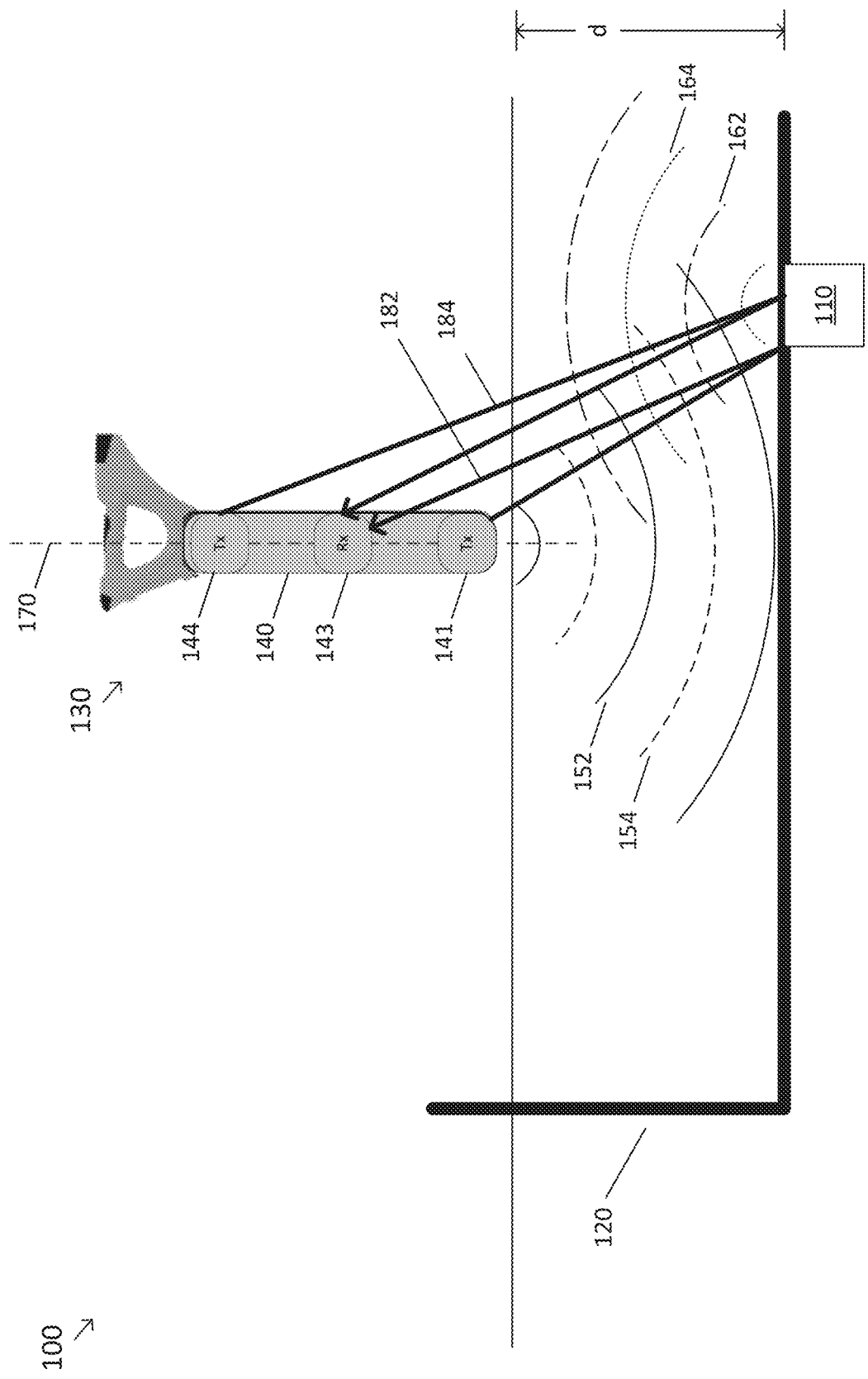
FIG. 1 is a simplified diagram of a marker locator system according to some embodiments.

FIG. 1 is a simplified diagram of a marker locator system 100 according to some embodiments. A marker 110 is affixed to an underground line 120 that is buried at a depth 'd'. A locator 130 is used to estimate the depth 'd' using electromagnetic signaling.

A transceiver 140 of locator 130 includes a plurality of transmitters 141 and 142 that are spatially separated. The plurality of transmitters 142 and 144 transmit a plurality of activation signals 152 and 154 to marker 110. Transceiver 140 further includes a receiver 143 that receives a plurality of response signals 162 and 164 from marker 110. Activation signal 152 and response signal 162 form a round-trip signal 182, and activation signal 154 and response signal 164 for a roundtrip signal 184.

Because the plurality of transmitters 141 and 142 are spatially separated, the path lengths of round trip signals 182 and 184 are different. Locator 130 estimates the depth 'd' by measuring and comparing the intensity of round-trip signals 182 and 184. Although it may be feasible to alter the path lengths of round trip signals 182 and 184 using a single transmitter by physically raising and lowering locator 130 or otherwise moving locator 130, such an approach may be burdensome to the operator and/or may not consistently achieve high accuracy depth estimates. Accordingly, including a plurality of transmitters 141 and 142 in marker locator system 100 simplifies the process of accurately determining the depth of marker 110.

Although FIG. 1 depicts two transmitters 141 and 142 for simplicity, it is to be understood that transceiver 140 may include more than two transmitters in different locations. For example, transceiver 140 may include a transmitter array that includes a plurality of transmitters spaced at fixed intervals in one or more dimensions. Correspondingly, marker locator system 100 may estimate the depth of marker 110 using more than two activation signals, response signals, and/or round-trip signals. In some embodiments, using more than two transmitters may improve the accuracy and/or reliability of the depth estimates.

In general, marker 110 is a passive device. For example, marker 110 may be a resonant ball marker. In order to generate response signals 162 and 164, marker 110 absorbs and retransmits energy from activation signals 152 and 154. According to some embodiments, marker 110 may include an antenna and a resonant circuit (e.g., an LC tank circuit) that couples to electromagnetic signals at a resonant frequency. Consistent with such embodiments, activation signals 152 and/or 154 may each include bursts of electromagnetic radiation at the resonant frequency. Energy from each burst is received by marker 110 and stored in the resonant circuit. At the end of the burst, marker 110 releases the energy stored in the resonant circuit by transmitting an exponentially decaying signal corresponding to response signals 162 and 164. In some examples, the radius of marker 110 and/or an antenna of marker 110 is 10 cm or less (e.g., 6 cm).

In some examples, activation signals 152 and 154 and response signals 162 and 164 may be low frequency electromagnetic signals that match the resonant frequency of marker 110. For example, the resonant frequency of marker 110 may be between 30 and 250 kHz. Consistent with such examples, activation signals 152 and 154 and/or response signals 162 and 164 may be transmitted and/or received using magnetic induction loops, such as ferrite-core induction loops, air-core induction loops, and/or the like.

In some examples, activation signals 152 and 154 may include periodic burst sequences characterized by a duty cycle and a burst frequency. For example, the duty cycle may be 10-15% and the burst frequency may be a few kHz or less (substantially less than the resonant frequency of marker 110). Each burst in the periodic burst sequences may include a predetermined number of cycles (e.g., 25 cycles) at the resonant frequency of marker 110.

Response signals 162 and 164 include a sequence of exponentially decaying waveforms trailing each burst in the burst sequence of activation signals 152 and 154. Intensity measurements are obtained by integrating response signals 162 and 164 over one or more burst cycles. The exponentially decaying waveforms may be characterized by a frequency, phase, and lifetime. To improve the signal to noise ratio of each of the intensity measurements, locator 130 may correlate and/or filter response signal 160 based on the frequency, phase, and/or lifetime.

Based on the intensity measurements, locator 130 estimates the depth 'd' of marker 110. According to some embodiments, locator 130 may provide feedback to an operator regarding marker 110 by any suitable mechanism, such as audio, visual, and/or haptic feedback. For example, locator 130 may indicate the estimated depth 'd' of marker 110 to the user through a display interface. The display interface may convey depth information in various formats including text, numbers, colors, bar graphs, arrows, meters, needles, maps and/or the like. In some examples, the depth information may be stored in memory and/or transmitted over a network for further processing and/or record-keeping.

To ensure that each of round-trip signals has a different path length, activation signals 152 and 154 may be transmitted from two or more positions separated along an elongate axis 170 of locator 130.

Figure 2:
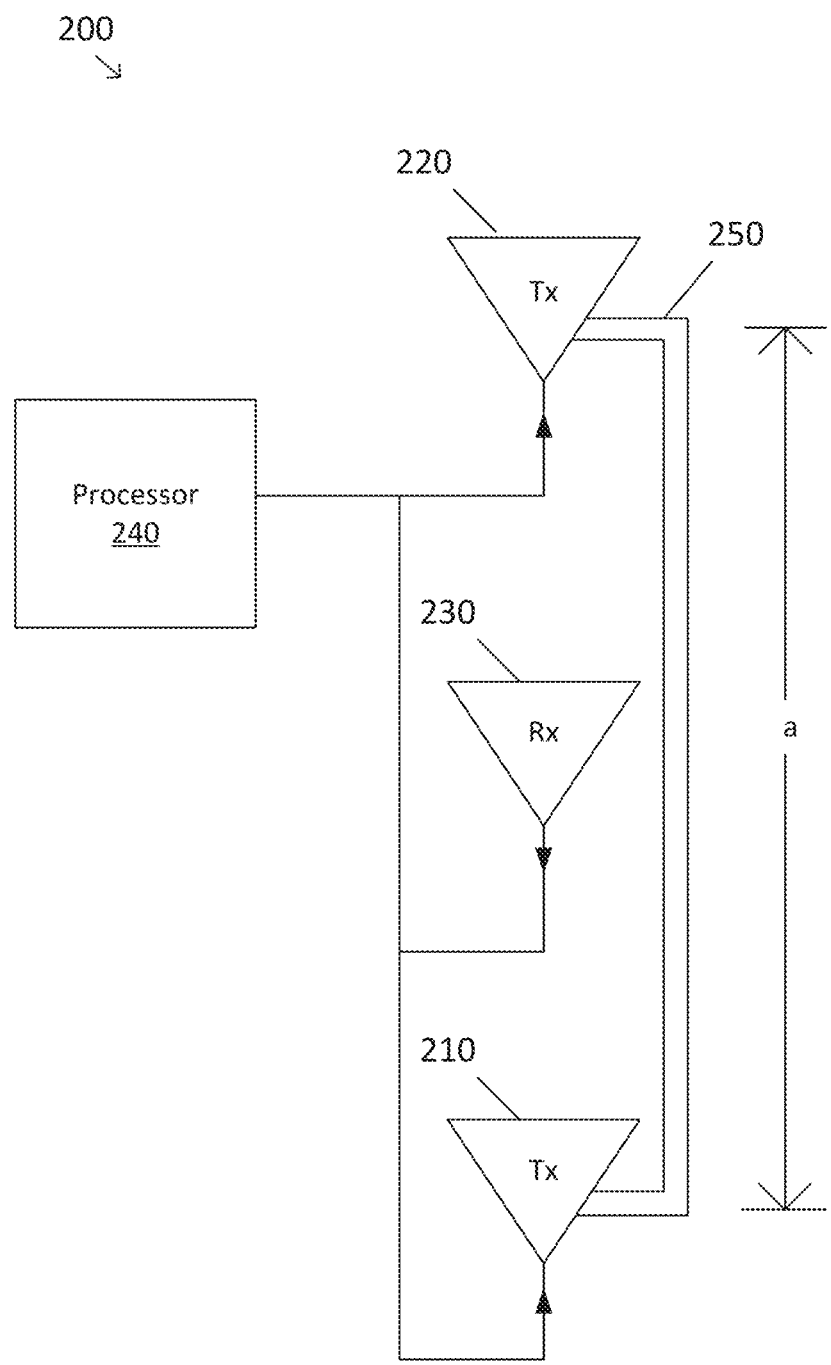
FIG. 2 is a simplified diagram of a marker locator with a plurality transmitters according to some embodiments.

FIG. 2 is a simplified diagram of a marker locator 200 with a plurality of transmitters according to some embodiments. According to some embodiments consistent with FIG. 1, marker locator 200 may be used to implement locator 130 and/or transceiver 140 of marker locator system 100. Marker locator 200 includes a plurality (e.g., a pair) of transmitters 210 and 220 and a receiver 230. Each of transmitters 210 and 220 and receiver 230 are coupled to a processor 240.

Transmitters 210 and 220 are located at first and second positions, respectively, separated by a distance 'a' along an elongate axis of marker locator 200. According to some embodiments, the distance 'a' may be fixed. For example, transmitter 210 and 220 may be coupled by a rigid member 250 and/or disposed within a same enclosure/housing. In some examples, the distance 'a' may be approximately 20 cm. However, in some embodiments, the distance 'a' may be variable and/or adjustable. Receiver 230 may be located between transmitters 210 and 220 and/or may be collinear with transmitters 210 and 220 (i.e., positioned along the elongate axis of marker locator 200). For example, receiver 230 may be located at a fixed or adjustable position near the lower transmitter 210 to be reduce the distance between receiver 230 and the ground.

According to some embodiments, transmitters 210 and 220 may include magnetic induction loops, such as ferrite-core induction loops, air-core induction loops, and/or the like. According to some embodiments, receiver 230 may include magnetic induction loops and/or other types of sensors, such as magnetometers, Hall effect sensors, magnetoresistive devices, and/or the like. Transmitters 210 and 220 and/or receiver 230 may further include signal processing circuitry to amplify, filter, convert (e.g., perform analog to digital or digital to analog conversion), and/or perform other signal processing operations. A particular embodiment of receiver 230 is discussed in greater detail below with reference to FIG. 3. To the extent that transmitters 210 and 220 and/or receiver 230 are not isotropic (i.e., they do not radiate or detect equally in all directions), they may generally be oriented along the elongate axis of marker locator 200.

To determine the depth of a buried marker, such as marker 110, transmitters 210 and 220 each generate activation signals, such as activation signals 152 and 154. A first activation signal is emitted by transmitter 210, and a second activation signal is emitted by transmitter 220. At least a portion of the energy in the activation signals is captured and retransmitted by the buried marker to form response signals, such as response signals 162 and 164. The response signals are detected by receiver 230. Pairs of activation and response signals form round-trip signals, such as round-trip signals 182 and 184.

Processor 240 controls which of transmitters 210 and 220 is active at a given point in time to distinguish between the round-trip signals. According to some embodiments, processor 240 may implement a time-division multiplexing scheme to separate the round-trip signals. For example, processor 240 may instruct transmitter 210 to transmit several dozen (e.g., 100) burst cycles while transmitter 220 is inactive. Subsequently, processor 240 may instruct transmitter 220 to transmit several dozen (e.g., 100) burst cycles while transmitter 210 is inactive, and so on. Processor 240 may control other aspects of the activation signals, including their amplitude, frequency, phase, duty cycle, burst start and end times, and/or the like. Processor 240 may send one or more synchronization signals to receiver 230, such as a synchronization signal indicating the beginning or end of a burst, to facilitate detection of the response signals.

Processor 240 receives the first and second response signals from receiver 230. Processor 240 may perform one or more signal processing operations on the first and second response signals, such as integration, averaging and/or analog to digital conversion. Processor 240 determines the intensity of each of the round-trip signals by measuring the magnitude of the first and second response signals. Advantageously, the intensity of each of the round-trip signals is measured without moving marker locator 200 and/or components within marker locator 200.

Because transmitters 210 and 220 are separated by the distance 'a', the path length of the first round-trip signal is shorter than the path length of the second round-trip signal by the distance 'a'. Assuming marker locator 200 is positioned relatively far from the buried marker such that the far-field approximation is valid, processor 240 may estimate the depth of the ball marker using the equation:

$$Z = \frac{a + \sqrt{2 \cdot C \cdot R^2 - R^2 + C \cdot a^2 - C^2 \cdot R^2}}{C - 1} \quad \text{(Eq. 1)}$$

where Z represents the depth estimate, R represents the radius of transmitters 210 and 220 (assuming transmitters 210 and 220 are configured as inductive loops), and C is a value representing $K^{2/3}$, where K is the ratio between the first and second intensity measurements. A derivation of Eq. 1 is provided below with reference to FIG. 5. Although Eq. 1 assumes that the transmitters 210 and 220 are inductive loops with the same radius R, it is to be understood that Eq. 1 may be modified in embodiments where these assumptions are relaxed. For example, Eq. 1 may be modified using one or more calibration and/or correction factors.

Figure 3:
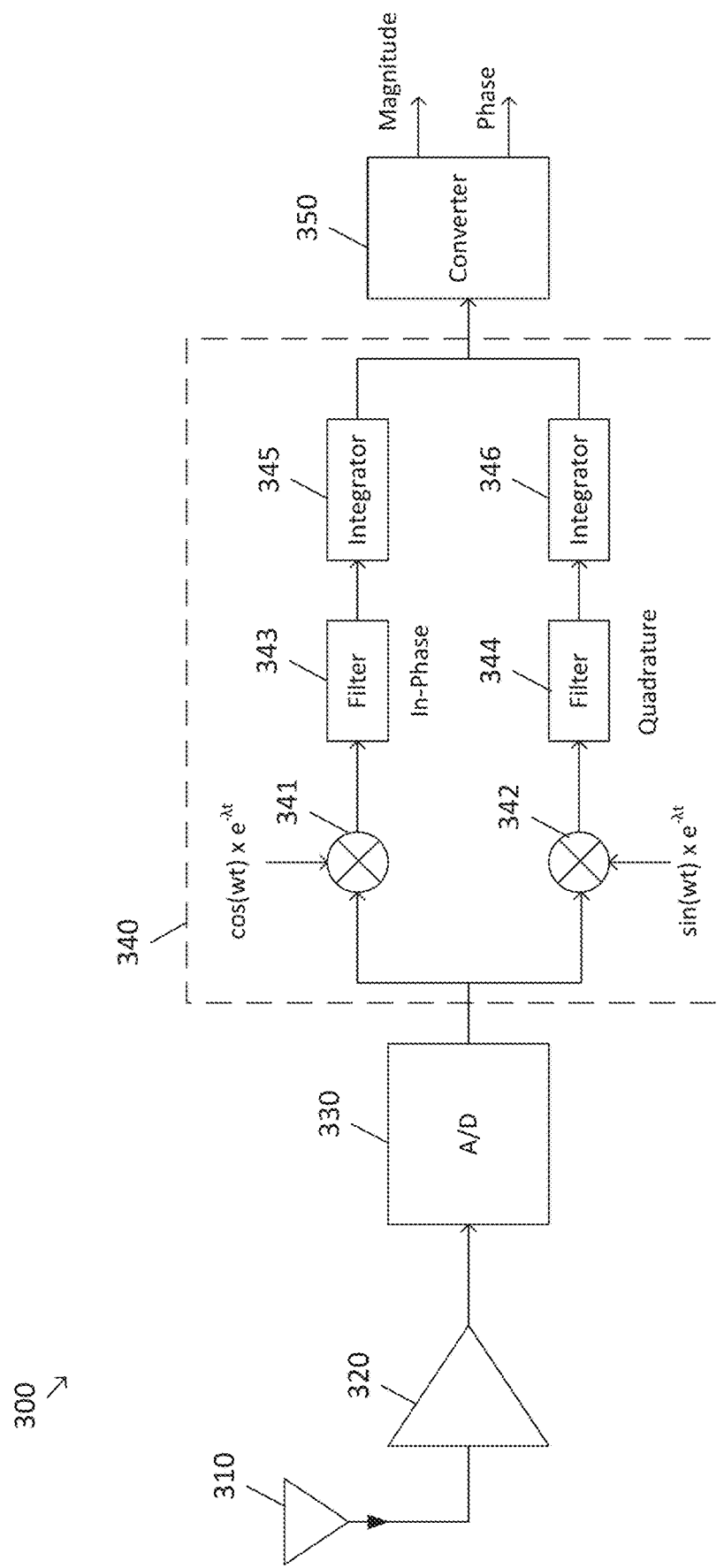
FIG. 3 is a simplified diagram of a receiver of a marker locator according to some embodiments.

FIG. 3 is a simplified diagram of a receiver 300 of a marker locator according to some embodiments. According to some embodiments consistent with FIGS. 1-2, receiver 300 may be used to implement receiver 230 and/or processor 240 of marker locator 200. Receiver 300 is used to reduce or eliminate noise when measuring the intensity of one or more round-trip signals to determine the depth of a buried marker.

An antenna 310 detects electromagnetic signals, such as response signals 162 and 164. Antenna 310 may include any suitable device for converting electromagnetic signals into electronic signals. For example, antenna 310 may include an inductive loop, a magnetometer, and/or the like. An amplifier 320 increases the signal level of the detected signal. In some examples, amplifier 320 may include a low noise amplifier (LNA) to maintain low noise levels during signal amplification. An analog to digital converter (ADC) 330 digitizes the analog electronic signal output by amplifier 320. In general, ADC 330 provides sufficient amplitude resolution to accurately represent the signal level and sufficient time resolution (e.g., sampling frequency) to capture the time-dependent features of the detected electromagnetic signals. For example, ADC 330 may operate at 16-bit resolution at a frequency of 1 MHz.

A phase-sensitive detector stage 340 includes an in-phase mixer 341, a quadrature mixer 342, an in-phase matched filter 343, a quadrature matched filter 344, an in-phase integrator 345, and a quadrature integrator 346. In-phase mixer 341 and quadrature mixer 342 are matched to the resonant frequency of the buried marker and may also be matched to the exponential decay lifetime of the buried marker. Similarly, in-phase matched filter 343 and/or quadrature matched filter 344 may be matched to the exponential decay lifetime of the buried marker. In-phase integrator 345 and quadrature integrator 346 perform integration and/or averaging to generate intensity measurements corresponding to the in-phase and quadrature components of the detected signal, respectively. A converter 350 may convert the in-phase and quadrature representation of the intensity measurements to magnitude and phase representation, where the magnitude is given by $\sqrt{I^2 + Q^2}$ and the phase is given by $$\tan^{-1}\left(\frac{Q}{I}\right)$$

where I and Q represent the in-phase and quadrature intensities, respectively.

Figure 4:
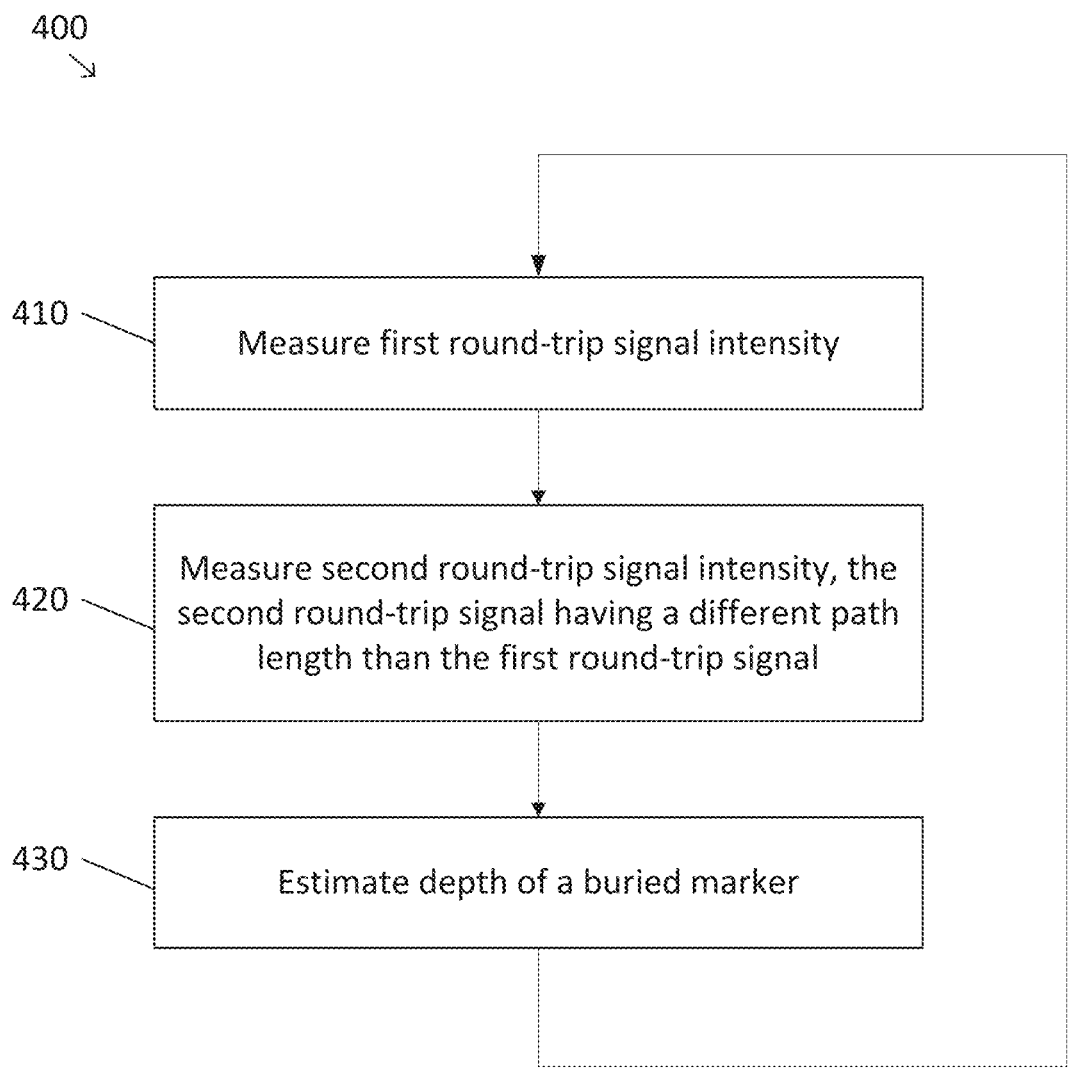
FIG. 4 is a simplified diagram of a method for estimating the depth of a marker according to some embodiments.

FIG. 4 is a simplified diagram of a method 400 for estimating the depth of a marker according to some embodiments. According to some embodiments consistent with FIGS. 1-3, method 400 may be performed by a processor, such as processor 240, to estimate the depth of a marker, such as marker 110.

At a process 410, a first round-trip signal intensity is measured. The first round-trip signal intensity corresponds to the strength of a signal that is transmitted by a locator, such as locator 130, to the marker and is retransmitted by the marker back to the locator. The first round-trip signal may be decomposed into an activation signal from the locator to the marker, such as activation signal 152, and a response signal from the marker to the locator, such as response signal 162. According to some embodiments, the first round-trip signal intensity may correspond to an averaged (and/or integrated) intensity of the response signal.

At a process 420, a second round-trip signal intensity is measured, the second round-trip signal having a different path length than the first round-trip signal. Like the first round-trip signal intensity, the second round-trip signal intensity corresponds to the strength of a signal that is transmitted by the locator to the marker and is retransmitted by the marker back to the locator. The second round-trip signal may be decomposed into an activation signal from the locator to the marker, such as activation signal 154, and a response signal from the marker to the locator, such as response signal 164. According to some embodiments, the second round-trip signal intensity may correspond to an averaged (and/or integrated) intensity of the response signal.

The first and second round-trip signals of processes 410 and 420, respectively, are transmitted by different transmitters located at different positions. Accordingly, the path length of the second round-trip signal is different than the path length of the first round-trip signal. Thus, the first and second round-trip signal intensities may be measured without moving the locator and/or components within the locator between measurements. In order to distinguish between the first and second round-trip signals, the first and second round-trip signals are multiplexed. For example, the first and second round-trip signals may be multiplexed using techniques that include time-division multiplexing, frequency-division multiplexing, code-division multiplexing, space-division multiplexing, and/or the like.

At a process 430, the depth of the marker is estimated. The depth of the marker is estimated by comparing the first and second round-trip signal intensities. For example, the depth of the marker may be estimated based on a ratio of the first and second round-trip signal intensities. According to some embodiments, the depth of the marker may be estimated by solving Eq. 1. Upon completion of process 430, method 400 may proceed back to process 410 to continuously and/or periodically, update the depth estimate. According to some embodiments, the a plurality of depth estimates may be obtained over time and filtered and/or averaged to refine the depth estimate.

Figure 5:
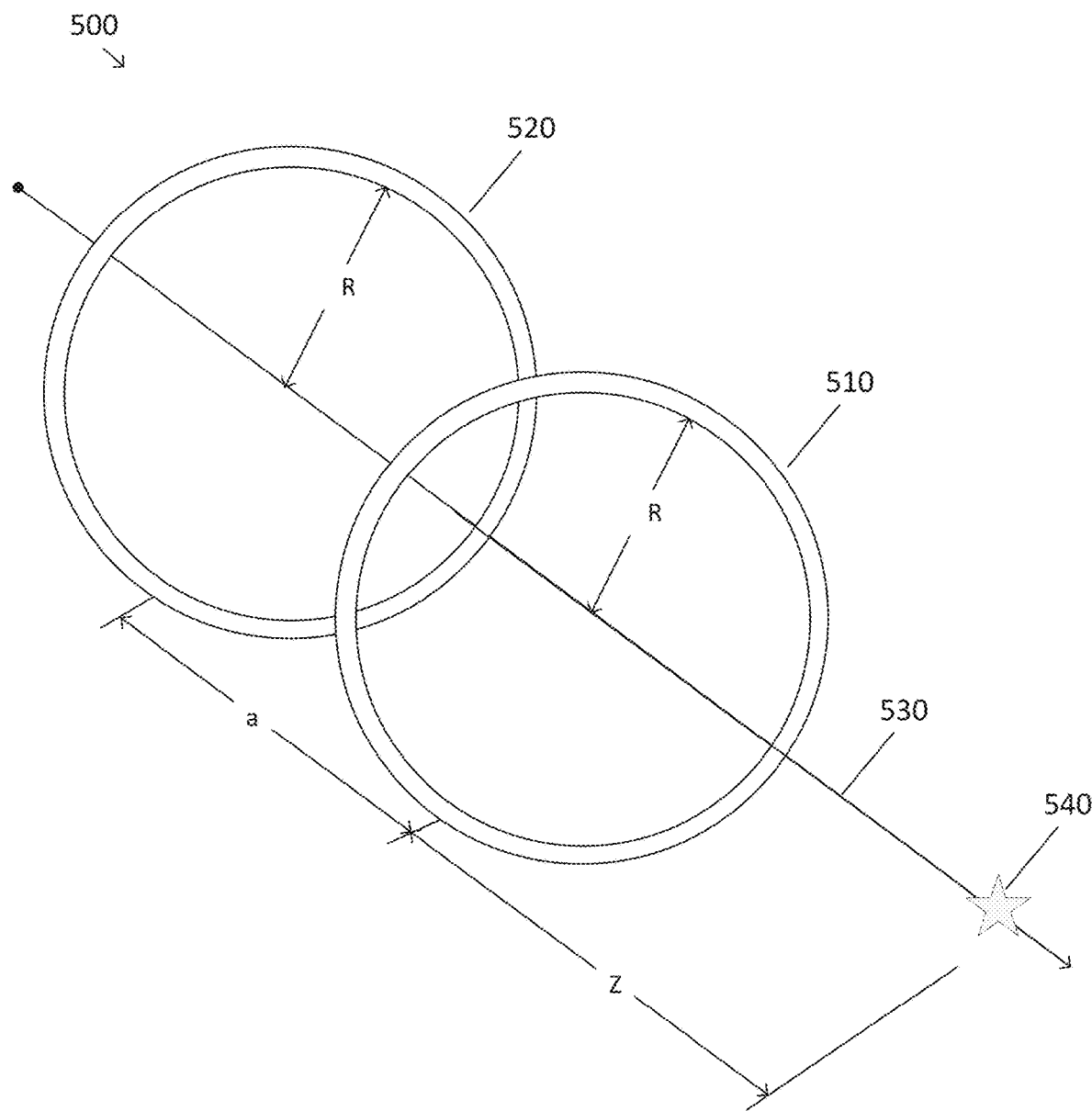
FIG. 5 is a simplified diagram of a plurality of inductive loops according to some embodiments.

FIG. 5 is a simplified diagram of a plurality of inductive loops 500, including inductive loops 510 and 520, according to some embodiments. According to some embodiments consistent with FIGS. 1-4, inductive loops 510 and 520 may be used to implement transmitter 210 and/or transmitter 220 of marker locator 200. Inductive loops 510 and 520 are oriented along a z-axis 530 (e.g., a depth axis). Inductive loops 510 and 520 are separated by a distance 'a' along the z-axis.

The Biot-Savart Law provides that the magnetic field strength at a point of interest 540 generated by a current flowing through inductive loop 510 is given by the equation:

$$B_1 = \frac{\mu_0}{4\pi} * \frac{2\pi R^2 I \cdot N}{(Z^2 + R^2)^{3/2}} \quad \text{(Eq. 2)}$$

Where Z is the distance between the point of interest and inductive loop 510, $B_1$ is the magnetic field strength at the position Z, $\mu_0$ is the permeability constant, R is the radius of inductive loop 510, N is the number of turns in inductive loop 510, and I is the current flowing through inductive loop 510.

Similarly, the Biot-Savart Law provides that the magnetic field strength at depth 'Z' generated by a current flowing through inductive loop 520 is given by the equation:

$$B_2 = \frac{\mu_0}{4\pi} * \frac{2\pi R^2 I \cdot N}{((Z+a)^2 + R^2)^{3/2}} \quad \text{(Eq. 3)}$$

Where $B_2$ is the magnetic field strength at a depth Z, $\mu_0$ is the permeability constant, R is the radius of inductive loop 510, N is the number of turns in inductive loop 510, and I is the current flowing through inductive loop 510. It is observed that when R is small compared to Z, the magnetic field strength scales approximately according to $1/Z^3$ (the far-field approximation).

The ratio of Eqs. 2 and 3 is given by the equation:

$$K = \left[\frac{(Z+a)^2 + R^2}{Z^2 + R^2}\right]^{3/2} \quad \text{(Eq. 4)}$$

Applying the substitution $C=K^2/3$ to Eq. 4 and solving for Z results in Eq. 1, as described previously with respect to FIG. 2.

Figure 6:
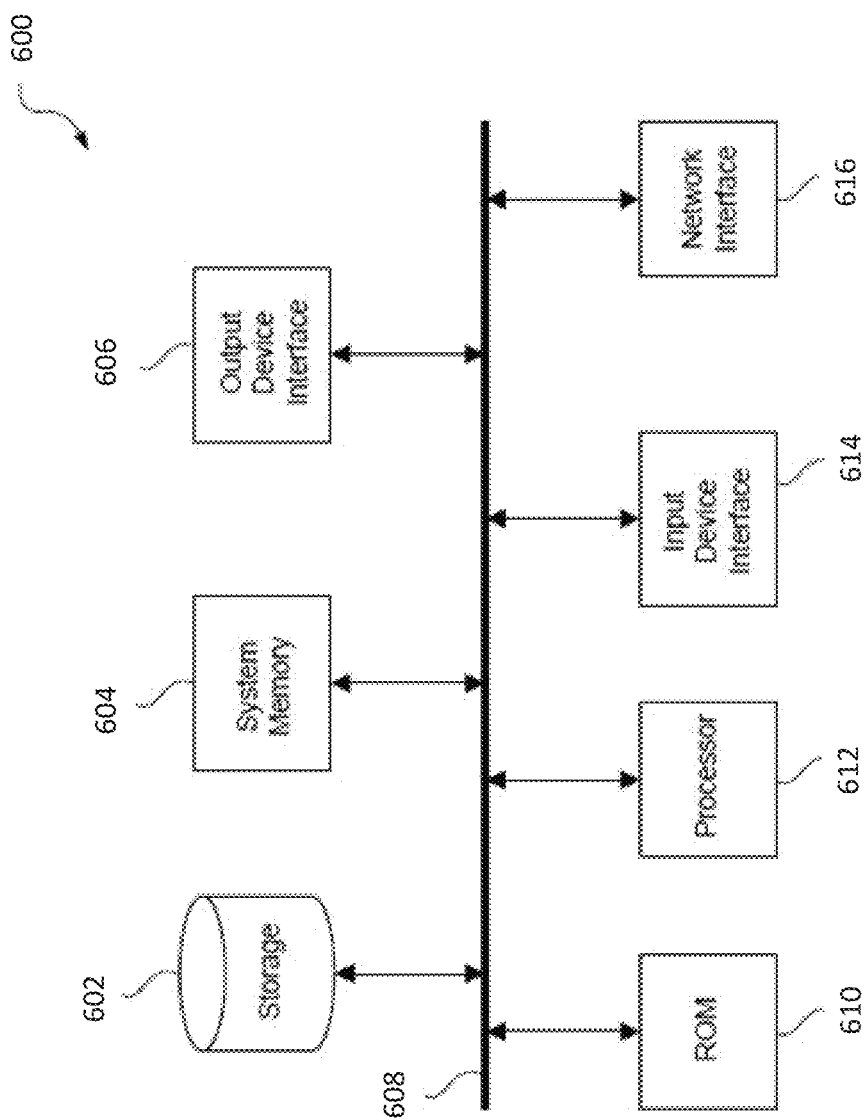
FIG. 6 is a simplified diagram of a computer system in which embodiments of the present disclosure may be implemented.

FIG. 6 is a simplified diagram of a computer system 600 in which embodiments of the present disclosure may be implemented. Computer system 600 may be adapted for estimating the depth of a buried marker. For example, the steps of the operations of method 400 of FIG. 4 may be implemented using system 600. System 600 can be a computer, phone, personal digital assistant (PDA), or any other type of electronic device. Such an electronic device includes various types of computer readable media and interfaces for various other types of computer readable media. As shown in FIG. 6, system 600 includes a permanent storage device 602, a system memory 604, an output device interface 606, a system communications bus 608, a read-only memory (ROM) 610, processing unit(s) 612, an input device interface 614, and a network interface 616.

Bus 608 collectively represents all system, peripheral, and chipset buses that communicatively connect the numerous internal devices of system 600. For instance, bus 608 communicatively connects processing unit(s) 612 with ROM 610, system memory 604, and permanent storage device 602.

From these various memory units, processing unit(s) 612 retrieves instructions to execute and data to process in order to execute the processes of the subject disclosure. The processing unit(s) can be a single processor or a multi-core processor in different implementations.

ROM 610 stores static data and instructions that are needed by processing unit(s) 612 and other modules of system 600. Permanent storage device 602, on the other hand, is a read-and-write memory device. This device is a non-volatile memory unit that stores instructions and data even when system 600 is off. Some implementations of the subject disclosure use a mass-storage device (such as a magnetic or optical disk and its corresponding disk drive) as permanent storage device 602.

Other implementations use a removable storage device (such as a floppy disk, flash drive, and its corresponding disk drive) as permanent storage device 602. Like permanent storage device 602, system memory 604 is a read-and-write memory device. However, unlike storage device 602, system memory 604 is a volatile read-and-write memory, such as random access memory. System memory 604 stores some of the instructions and data that the processor needs at runtime. In some implementations, the processes of the subject disclosure are stored in system memory 604, permanent storage device 602, and/or ROM 610. For example, the various memory units include instructions for estimating the depth of a marker in accordance with some implementations. From these various memory units, processing unit(s) 612 retrieves instructions to execute and data to process in order to execute the processes of some implementations.

Bus 608 also connects to input and output device interfaces 614 and 606. Input device interface 614 enables the user to communicate information and select commands to system 600. Input devices used with input device interface 814 include, for example, alphanumeric, QWERTY, or T9 keyboards, microphones, and pointing devices (also called "cursor control devices"). Output device interfaces 606 enables, for example, the display of images generated by system 600. Output devices used with output device interface 606 include, for example, printers and display devices, such as cathode ray tubes (CRT) or liquid crystal displays (LCD). Some implementations include devices such as a touchscreen that functions as both input and output devices. It should be appreciated that embodiments of the present disclosure may be implemented using a computer including any of various types of input and output devices for enabling interaction with a user. Such interaction may include feedback to or from the user in different forms of sensory feedback including, but not limited to, visual feedback, auditory feedback, or tactile feedback. Further, input from the user can be received in any form including, but not limited to, acoustic, speech, or tactile input. Additionally, interaction with the user may include transmitting and receiving different types of information, e.g., in the form of documents, to and from the user via the above-described interfaces.

Also, as shown in FIG. 6, bus 608 also couples system 600 to a public or private network (not shown) or combination of networks through a network interface 616. Such a network may include, for example, a local area network (LAN), such as an Intranet, a wireless network, and/or a wide area network (WAN), such as the Internet. Any or all components of system 600 can be used in conjunction with the subject disclosure.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media can store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, such as application specific integrated circuits (ASICs) or field programmable gate arrays (FPGAs). In some implementations, such integrated circuits execute instructions that are stored on the circuit itself. Accordingly, the steps of the operations of method 400 of FIG. 4, as described above, may be implemented using system 600 or any computer system having processing circuitry or a computer program product including instructions stored therein, which, when executed by at least one processor, causes the processor to perform functions relating to these methods.

As used in this specification and any claims of this application, the terms "computer", "server", "processor", and "memory" all refer to electronic or other technological devices. These terms exclude people or groups of people. As used herein, the terms "computer readable medium" and "computer readable media" refer generally to tangible, physical, and non-transitory electronic storage mediums that store information in a form that is readable by a computer.

Embodiments of the subject matter described in this specification can be implemented in a computing system that includes a back end component, e.g., a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network (LAN), a wireless network, and a wide area network (WAN), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., a web page) to a client device (e.g., for purposes of displaying data to and receiving user input from a user interacting with the client device). Data generated at the client device (e.g., a result of the user interaction) can be received from the client device at the server.

It is understood that any specific order or hierarchy of steps in the processes disclosed is an illustration of exemplary approaches. Based upon design preferences, it is understood that the specific order or hierarchy of steps in the processes may be rearranged, or that all illustrated steps be performed. Some of the steps may be performed simultaneously. For example, in certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Furthermore, the exemplary methodologies described herein may be implemented by a system including processing circuitry or a computer program product including instructions which, when executed by at least one processor, causes the processor to perform any of the methodology described herein.

What is claimed is:

1. A marker locator comprising:
   a first transmitter that generates a first activation signal to activate a marker, the first transmitter being located at a first position;
   a second transmitter that generates a second activation signal to activate the marker, the second transmitter being located at a second position apart from the first position;
   a receiver that detects first and second response signals, the first and second response signals transmitted by the marker, the first and second response signals respectively corresponding to the first and second activation signals, wherein the receiver is located at a third position apart from the first position and the second position; and a processor that determines a depth of the marker based on the first and second response signals, the processor being coupled to the receiver.

2. The marker locator of claim 1, wherein at least one of the first and second transmitters includes an inductive loop.

3. The marker locator of claim 2, wherein the inductive loop includes one or more of an air core and a ferrite core.

4. The marker locator of claim 1, wherein the first and second activation signals and the first and second response signals are separated by time division multiplexing.

5. The marker locator of claim 1, wherein the first and second activation signals include burst sequences, each burst in the burst sequences being at a resonant frequency of the marker.

6. The marker locator of claim 5, wherein the resonant frequency of the marker is between 30 and 250 kHz.

7. The marker locator of claim 5, wherein each of the burst sequences has a duty cycle of between 10% and 15%.

8. The marker locator of claim 1, wherein the first and second response signals are characterized by an exponential decay lifetime.

9. The marker locator of claim 1, wherein the receiver applies phase sensitive detection to the first and second response signals.

10. The marker locator of claim 1, wherein the first and second transmitters are coupled by a rigid member.

11. The marker locator of claim 1, wherein the processor determines the depth of the marker based on an equation:

$$Z = \frac{a + \sqrt{2 \cdot C \cdot R^2 - R^2 + C \cdot a^2 - C^2 \cdot R^2}}{C - 1}$$

where:
- Z represents the depth of the marker;
- R represents a radius of the first and second transmitters;
- a represents a distance between the first and second positions; and
- C is given by the equation $C = K^{2/3}$, where K is a ratio of a measured intensity of the first and second response signals.

12. The marker locator of claim 1, wherein the marker includes a resonant ball marker.

13. The marker locator of claim 1, wherein the marker locator does not move while detecting the first and second response signals.

* * * * *